US012613791B2

(12) United States Patent
    Kahr et al.

(10) Patent No.: US 12,613,791 B2
(45) Date of Patent: Apr. 28, 2026

(54) METHOD AND DEVICE FOR TESTING THE COMPATIBILITY BETWEEN APPLICATION SOFTWARE AND A MOBILE WORKING MACHINE

(71) Applicant: Robert Bosch GmbH, Stuttgart (DE)

(72) Inventors: Christian Kahr, Esslingen (DE); Joshua-Niclas Oergele, Waldenbuch (DE); Mouham Tanimou, Goeppingen (DE); Tobias Krug, Munich (DE); Udo Schulz, Vaihingen/Enz (DE)

(73) Assignee: ROBERT BOSCH GMBH, Stuttgart (DE)

( * ) Notice: Subject to any disclaimer, the term of this patent is extended or adjusted under 35 U.S.C. 154(b) by 0 days.

(21) Appl. No.: 17/802,671

(22) PCT Filed: Mar. 5, 2021

(86) PCT No.: PCT/EP2021/055626
    § 371 (c)(1),
    (2) Date: Aug. 26, 2022

(87) PCT Pub. No.: WO2021/209192
    PCT Pub. Date: Oct. 21, 2021

(65) Prior Publication Data
    US 2023/0097262 A1     Mar. 30, 2023

(30) Foreign Application Priority Data
    Apr. 15, 2020     (DE) .................... 10 2020 204 714.6

(51) Int. Cl.
    *G06F 11/3668*     (2025.01)
    *G06F 8/65*     (2018.01)
    *G06F 11/30*     (2006.01)

(52) U.S. Cl.
    CPC ............ *G06F 11/3688* (2013.01); *G06F 8/65* (2013.01); *G06F 11/3013* (2013.01)

(58) Field of Classification Search
    CPC ..... G06F 8/60; G06F 8/61; G06F 8/65; G06F 11/36
    See application file for complete search history.

(56) References Cited

U.S. PATENT DOCUMENTS

| | | | |
|---|---|---|---|
| 11,722,302 B2* | 8/2023 | Covaci | ................... G06F 16/27 |
| 2006/0206449 A1 | 9/2006 | Fletcher et al. | |
| | | (Continued) | |

FOREIGN PATENT DOCUMENTS

| | | |
|---|---|---|
| CN | 111008502 A | 4/2020 |
| DE | 102015203766 A1 | 9/2016 |
| DE | 102018205872 A1 | 10/2019 |

OTHER PUBLICATIONS

International Search Report for PCT/EP2021/055626, Issued Jun. 7, 2021.

(Continued)

*Primary Examiner* — Duy Khuong T Nguyen
(74) *Attorney, Agent, or Firm* — NORTON ROSE FULBRIGHT US LLP

(57) ABSTRACT

A method for testing compatibility between application software and a mobile working machine. The method includes: operating data that are captured during operation of the mobile working machine are aggregated in a cloud, with the aid of the operating data, the mobile working machine is modeled by a digital twin, and the compatibility of the application software is tested in the cloud with the aid of the digital twin.

8 Claims, 1 Drawing Sheet

(56) References Cited

U.S. PATENT DOCUMENTS

| | | | |
|---|---|---|---|
| 2008/0271025 A1* | 10/2008 | Gross | G06F 21/577 |
| | | | 718/102 |
| 2019/0138333 A1* | 5/2019 | Deutsch | G06Q 10/0631 |
| 2020/0103842 A1 | 4/2020 | Kobayashi | |
| 2020/0174769 A1* | 6/2020 | Zolotow | G06F 8/65 |
| 2021/0117166 A1* | 4/2021 | Michalakis | G06F 8/60 |

OTHER PUBLICATIONS

"Introduction to Intelligent Manufacturing", Chief Ed. Fan et al., (2019), Huazhong University of Science & Technology Press, Wuhan, China, with English translation, pp. 1-6.

\* cited by examiner

METHOD AND DEVICE FOR TESTING THE COMPATIBILITY BETWEEN APPLICATION SOFTWARE AND A MOBILE WORKING MACHINE

FIELD

The present invention relates to a method for testing the compatibility between application software and a mobile working machine. Moreover, the present invention relates to a corresponding device, a corresponding computer program and a corresponding storage medium.

BACKGROUND INFORMATION

Methods for deploying or updating software (SW) over a wireless data interface, also designated as over the air (OTA), are conventional. Generic methods are used both on application software (SOTA) and also on embedded system software (firmware, FOTA).

According to the prior art, FOTA and SOTA are used for example to update the control units of networked motor vehicles and mobile working machines. For the purpose of making a telematic connection between the bus system that couples the control units and the internet (figuratively called the "cloud"), there typically serves a vehicle connectivity gateway (VCG).

The functional scope of control units within vehicles may thus be extended beyond servicing and fault elimination by performance features that make use of existing sensors and actuators for new applications. Corresponding applications may be created by the producers or original equipment manufacturers (OEMs) of a mobile working machine—for example by way of a development kit—and offered on a digital sales platform in the cloud. Possible extensions are for example advanced telemetry functions or special functions in the agricultural sector, such as targeted weed control.

German Patent Application No. DE 10 2015 203766 A1 describes a modular system for a vehicle, having a device management client that is connected over the air to a back-end device management server, for the purpose of exchanging device, vehicle, diagnostic and software update information, having a download client that is connected over the air to a back-end download server, for the purpose of downloading a software update from the back end to the vehicle, having software update clients that are connected to the download client, for the purpose of applying the software update, and having a vehicle update client that is connected to the download client and the software update client, for the purpose of coordinating the software update.

In a reference to the lading manifests that have been used for centuries in shipping, in computer technology too so-called manifest files are used to group together metadata by way of an archive or other grouping of further files. Corresponding concepts are used for example in the common language infrastructure (CLI) that is standardized in ISO/IEC 23271, in the Windows operating system, in the hypertext markup language HTML5, in the Java language environment, and in various Linux distributions. For example, for the purpose of updating embedded systems, U.S. Patent Application Publication No. US 2006/0206449 A1 describes package management by way of a software package manifest (SPM).

German Patent Application No. DE 10 2018 205872 A1 describes a method for generating a digital twin, for example of a machine, in which, using a metamodel, descriptive data that contain properties of digital data are generated. Furthermore, communication information is produced. For the purpose of generating the digital twin, the descriptive data, the communication information and a designation of the machine are grouped together.

SUMMARY

The present invention provides a method for testing the compatibility between application software and a mobile working machine, a corresponding device, a corresponding computer program and a corresponding storage medium.

The presented solution makes it possible to perform an inventive test of compatibility in advance, without any real system hardware or environment, and thus before a change that involves a real implementation, deployment or updating of the software is made to the functional arrangements.

As a result of the measures disclosed herein, advantageous further developments and improvements to the basic idea of the present invention. Thus, an ex-ante perspective may be provided, as a result of which the expense of designing and developing software can be reduced, for example by testing compatibilities virtually, or developing low-cost environmental models. In this way, the quality of the application software is enhanced, since the underlying data and hence the fundamental premises (used in particular in the design and the development process) are based on real data, which are captured efficiently by the modeling mechanism of the digital twin and stored at a central location in the cloud. Thus, it also becomes possible to support the procedure of installing hardware that is relevant to the application software (generally machine peripherals) on target machines, and of installing application software itself on the different target control units.

According to a further aspect of the present invention, an ex-post perspective may be provided, as a result of which for example diagnostics, problem analysis and compatibility testing take place after deployment/commissioning (typically, installation) of the application software, and the mobile working machine undergoes, for example, servicing or retrofitting depending on the result. Thus, the digital twin may be used in every phase of life of the application software, for example if there is a need for iterative or recurrent and mutually reliant activities in which either the totality of the data of all the machines in the field is involved (field data) or the individual device, with its libraries, interfaces, etc., has to be managed during operation. This is relevant for example in the installation of new, where applicable extension, application software, since these (or resources/libraries that are used) may affect one another and/or be mutually dependent and/or mutually exclusive.

According to a further aspect of the present invention, it may be provided for changes in configuration that are performed on the mobile working machine with the aid of this totality of data to be identified and written to the cloud in the form of a change history. In particular when there are numerous performance features, in this way the twin simplifies variant management and simultaneously serves as a reference status for the software configuration on the control unit, which in turn facilitates troubleshooting, customer service and testing of system integrity and compatibility—for example with the aid of a digital fingerprint—using external sensors and other accessories or peripherals, and ultimately facilitates use of the machine by the user.

BRIEF DESCRIPTION OF THE DRAWINGS

Specific exemplary embodiments of the present invention are presented in the figures and explained in more detail in the description below.

DETAILED DESCRIPTION OF EXAMPLE EMBODIMENTS

According to an example embodiment of the present invention, the digital twin is derived from querying the real system that is present and generating a model on different layers of abstraction. Possibly included are, for example, a list of the implemented performance features and system components, and a description of the target system, for example of attached sprayers for plant protection agents. Such a description may be made for example with reference to version number, configuration, available interfaces, or a fingerprint (cf. hash value, digital signature), it being possible for the fingerprint to be formed for example from signals, signal types (analog/digital) and signal resolutions or a combination of these. Similarly possible is a model of the actual software, the configurations, application data, etc.

The digital twin may also be generated on the abstraction layer of the system architecture of the feature enabling kit (FEK or required machine peripheral device) in order to consider the control unit in its entirety, which may also comprise a plurality of controllers or RAMS—which may be distributed or networked. Finally, one possibility is a system architecture model of the entire context, comprising machine, system components, control units, sensors, sprayers, etc.

These models are preferably stored in a cloud, and may be evaluated or otherwise processed from different perspectives. The underlying data are not themselves the digital twin; rather, the twin enables the consideration of one or more perspectives (component perspective, user perspective, market perspective, etc.) of the underlying volume of data or the model resulting from the data. Here, each perspective pertains to the posing of a particular question or setting of a particular objective—such as a phase of the development process.

Figure 1:
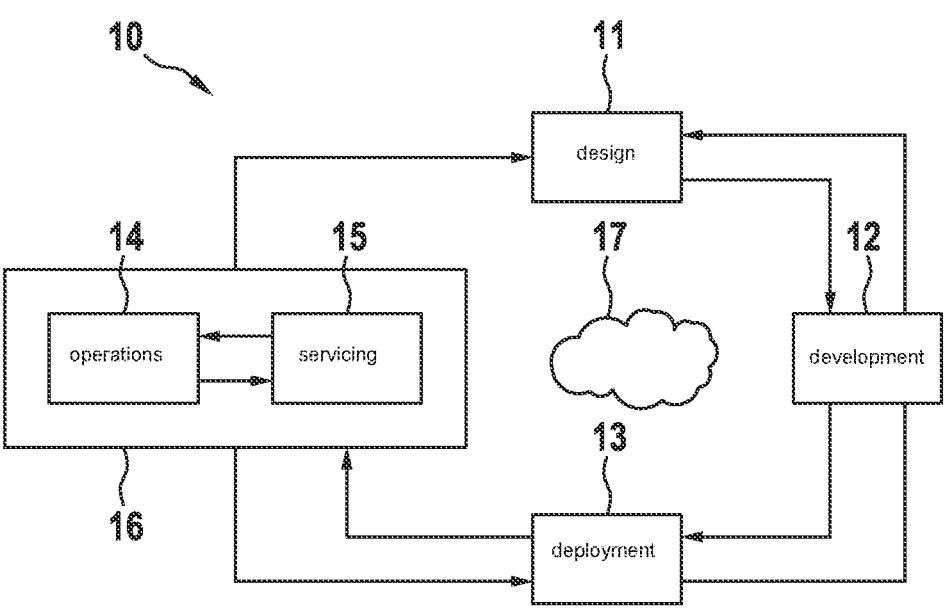
FIG. 1 shows the flow diagram of a method according to a first specific embodiment of the present invention.

The present invention is presented below with reference to the generally convention and recognized lifecycle phases of design (11), development (12), deployment (13), operations (14), and servicing (15), from different perspectives, with different principal functions, and with reference to a plurality of questions posed (see FIG. 1). One objective of using digital twins here is to support a realistic and selectively iterative or repeatable development process (concept, implementation, testing, etc.). This enables as it were a "virtualization" of the process of design, development and deployment of the application software and its operation (14) when used in the field (16).

The starting point for design (11) is formed by an abstract description of the problem, functional idea or realizations from a data analysis in respect of correlations, frequencies, etc., for example for identifying weeds and spraying them while avoiding the crop plants. In this design phase, there is a need for an environment that enables plausibility checks of the requirements and an outline design on a higher layer of abstraction. The digital twin provides various models for this— for example I/O models of software, hardware and other system components—and perspectives of the environment that assist the design of the new idea.

For a spray system, for example, a possible environment has reference models for the control unit, camera, sprayer, tractor, plant (images, etc.), and so on, with optional environment simulation, for example for a particular tank capacity. This is followed by the system description of the new idea, with its system limits, by deconstruction—where necessary taking into account another abstraction layer—into a superposed system model (system setting or environment) with interactions by way of interfaces, communication relationships and data streams. This also allows effect chains to be produced.

It is possible for model conflicts to be found, for example on the basis of I/O models, if for example implausible I/O combinations occur, contrary control signals were used, or over- or underdetermined closed-loop control systems were designed. Finally, comparisons could already be made with other system descriptions, for example of different developer teams or suppliers, in respect of compatibility, similar parts, variants, etc., with the aim of identifying common modules, in the manner of a platform. This is already an initial design of effect chains, which are explained in more detail in the development (12) described below. A handover from design (11) to development (12) may take the form for example of a functional description.

The models described above may be based on real measured data or on theoretically ascertained physical data. The concrete model of the environment of the application software that is to be developed results for example from interfaces. Moreover, an overall "environmental model" is for example desirable to complete signal chains. In the worst case, this may model the entire environment, but it is typically of modular construction, depending on the interfaces used—such as the paths relevant to the controller design (11). Individual modules may relate to the respectively different underlying reference models, e.g. one for the FEK, sensor, tractor, sprayer, etc. Where appropriate, other modules may also be used, such as standardized interfaces with the aid of which different types of simulation software may be linked up (functional mock-up interface, FMI), or such as behavior models incorporated in MATLAB Simulink. In the context of smart farming, for example, these models also comprise in particular I/O and other interfaces of the target machine, and these may where appropriate be processed using a physical model. The model also supplies the dependencies needed in the development step for the respective performance feature, in particular further performance features, bus or other interfaces, external sensors, actuators, etc. that result from the I/O requirements of the performance feature or the component.

Here, the models and the interfaces between them may relate to different abstraction layers. Mixed simulation environments (model in the loop, MiL; software in the loop, SiL; processor in the loop, PiL; hardware in the loop, HiL) are also possible here.

Application software for the agricultural sector could for example relate to the following use: The challenge for the farmer is to use his or her machine in the field (16) to control weeds. A content provider wishes to extend the machine by adding a software function that assists the farmer in this by recognizing weeds and responding on a case-by-case basis in their treatment. For this purpose, the sprayer model, the camera model, the tractor model and the environmental or other type of system model are used. In this context, a model includes an input and an output; a distinction is made for example between the behavioral and the descriptive model.

Initially, a designer knows only which information, peripheral devices, etc. he or she would like to use: speed, image, etc. According to the present invention, the designer is thus offered the models that have the interfaces he or she needs. It is important for the designer to have knowledge of these models, since the required models may have to be parameterized.

From the point of view of functional safety, it is already possible in the course of this design (11) to estimate or even determine what is permissible, when this may occur and how it may be identified, and where the critical points in the effect chain, and redundancies and/or plausibility checks are required.

A further objective of the proposed method (10) is to support the development (12) of the application software or of all or some of the functional, software and hardware components with the aid of the design (11). For virtual development (12) without physical access to the target machine in an iteratively validating and verifying process alternating between design (11) and development (12), where appropriate field data are needed in order, with the aid of measurement results and an identified data-driven or parameterized physical behavioral model, to adapt the software component as well as possible to its functional (relevant) environment, and to test, simulate and release it.

Moreover, as regards the environment or environmental models, inheritance mechanisms relating to the type of properties are possible. This approach may also interact with splitting into different variants (variant tree, etc.) (horizontal viewpoint, variance over the respective abstraction layer). In a corresponding variant tree, associated with the edges and vertices are concrete relationships of the vertices and parameters. In this case, once again a variance may arise in the parameter set, for example as a result of wear, aging, manufacturing tolerance, etc. of the component concerned.

It is similarly possible that a customer-neutral and executable minimum level may be provided to new customers who would like to develop their own application software. This minimum level contains basic functionalities that are common to all machines of a (where appropriate) generic class—for example with reference to the interfaces used and the year of construction—of similar machines. In this way, there is provided a fallback level or starting basis to which, from a functional perspective, the development (12) can always relate. This software status may be assumed to be highly functional and usable on any control unit that is within that class. In this reference status, a system does not include any functionally distinguishing service or other performance features of third parties, but may be updated or further developed on request by third parties, for example for the purpose of troubleshooting. Sufficient for the basic behavior of the system, defined by its executability and minimum level of functionality, are for example a message broker, integration framework, layer of abstraction and time grid, this last being capable of being modified individually in the manifest by the customer.

The advantages of a development (12) of this kind consist in particular in the fact that, building on the results of the design (11) in the form of an interface model and the resulting inputs/outputs, the dynamic behavior (controlled system) in respect of resolution, latency and feedback develops cross-effects and other kinds of effect on the controlled system, and regression tests can be performed on it. Moreover, this procedure reduces the risk of injuring persons or damaging the machine or other objects in the course of tests—for example when observing marginal regions (high rotational speeds, etc.). In this context, it is possible to use any possible status of the controlled system virtually—including those that can seldom or never be tested in reality, because of the associated complexity.

In particular where there is a high level of variation between target machines in respect of sensors, actuators, etc., it would not be possible to carry out comprehensive test measures using real machines and all their possible configurations; however, using the different digital twins and their perspectives, these can be automated. Here, as in an ecosystem concept, interface providers may make available models of their components, or optimize their components with the use of field data.

In this way, predictions of a functionally expected behavior, or the simulation of particular business cases also become possible. For this purpose, the outline model or design (11) is considered with reference to the expected system behavior, using real data. The results of the simulation may then be compared with recorded measurement values, for example for the purpose of testing or assessing the quantity of seed that has actually been yielded and recorded according to a new algorithm. The underlying business case can be validated by this comparison.

Partial automation of the development (12) is also possible. Thus, for example already before use in the field (16), it is possible to perform mathematical processes such as the training of neural networks, the parameterization of physical functions, the learning and adapting of learning and adaptation methods and the initialization of functions. The user experience is improved by the possibility of remote support during the first trial or in the event of malfunction or servicing (15). Advantages also result in respect of the partitioning of software components and their association with different electronic control units (ECUs) with the possibility of communicating with implementation units such as a VCG, ECU, virtual machine, hypervisor, back end, intelligent sensor, or actuator. It is likewise possible to integrate customer-specific test scenarios—for example by selecting determined measurement protocols—and models into the already existing infrastructure. Finally, an SiL or other simulation is possible using the digital twin, with the result that software can already be tested in the laboratory.

As explained above, for making use of the digital twin, its perspectives are always of relevance: For example, a software developer wants to assess the utility of application software and the business case underlying it; its users test whether this utility justifies these costs. If the real machine, or the machine to be modified, or a corresponding system are known it is also possible to test which of the software or hardware components available for selection are most suitable—according to functional requirements, objectives or key performance indicators (KPIs) such as accuracy, cost, investment or performance.

The digital twin has numerous tasks for deployment (13) of the application software on hardware in changing and inhomogeneous integration environments. Typically, it is not possible to release for example a SOTA across the board, since the machines could be modified when used in the field (16), and there is a risk of unpredictable, destructive or other unsafe behavior of the machine. In this case, the digital twin of the individualized machine concerned ideally models these modifications and thus makes it possible to install new or extension application software without any undesired retroactive effect on the behavior of the target system.

For this purpose, the digital twin models the machine that may be modified, its FEK or software, and makes it possible, in the event of expected retroactive effects, to estimate whether these are still permissible in the context of the requirements. For the purpose of testing the SOTA, for example in order to update an interface when there is a new performance feature of the machine, there serve the records of the tests carried out in the preliminary stage of deployment (13), as a basis for simulations and tests after design (11) and development (12). This allows a prognosis to be derived for new performance features of determined machines, after the actual development (12) of the application software concerned.

A corresponding test of the mutual compatibility between application software and the machine can be carried out with the aid of the following concrete example: Within the context of a pre-functional compatibility test, a farmer can use a back-end application to test whether the software functions with the configuration of his or her machine, of which the digital twin exists in the cloud (17). In this context, static and dynamic dependencies and compatibilities may already be tested with the aid of the data from the digital twins—for example the processing sequence in respect of a possible deadlock or circular references—or the resulting exploitation of the system resources can be estimated before the software is first installed on the actual control unit or the machine equipped with this. This in turn enables a simplified release of functionalities, independently of the control unit, for example in the cloud (17), since the functional compatibility with varying system parts such as mechanical parts and other hardware (for example a dynamically variable sensor interface, or modified access to it) and software, including its components, can be ensured in the form of a post-functional compatibility test.

The functional compatibility between the software and the target machine, which is to be assessed before deployment (13) in the form of a pre-functional compatibility test, may also take into account not only its type and class, but for example the actual, real configuration of the machine, its version and later special modifications.

In this way, it is also possible to ensure functional safety by testing scenarios that could result in safety-critical situations. This proves particularly useful, since the status of safety technology and the legal requirements in this area that are based on it are continually being further developed.

Finally, in the preliminary stage of deployment (13) of new application software, it is possible to make sure that its old core function is maintained and thus backward compatibility can be ensured.

On identification of implausible signal patterns, for example in the integration layer, by comparison with other sensors, processes, etc., with the aid of correlations and cross-correlations a logical link can be made between the working machine, with tool, and the environment, or between the work procedure and the functional behavior. This allows faults in the system—for example relating to sensors, actuators and their control, software, mechanical parts or other aspects of the machine—and modifications outside the system to be deduced. The described identification also opens up the possibility of predicting whether despite, or specifically because of, the modification the actual system will still function with new components, or will continue to function with old ones. Finally, it is possible to analyze whether anything in the system has been impermissibly changed. Both with pre-functional and post-functional compatibility testing, the result may be that where appropriate functionalities need to be disabled or new software downloaded, for example for corresponding plug-ins.

In operation (14), the data are collected, in particular during runtime of the mobile working machine, and where appropriate aggregated, for example in order that the digital twin can be developed at all or its perspectives deduced. The basic structures for individual perspectives (for example compatibility testing) may also be developed without these data, for example if only configurations or static perspectives are needed. Data capture also serves to allow the I/O behavior of the models (both causally and in terms of correlation) to be used, and a test to be undertaken of which machines support which particular application software. Aggregation may, by defined rules and across multiple machines, relate to all the features of individual twins or coherent perspectives of a twin. With the aid of a meta-analysis, the result of the aggregation may be used to identify similar parts or typical variants and to use these for example in the design (11). Moreover, using the aggregated field data that are modeled by the measured I/O behavior of the entire variance across machines, proofs of use may be produced, decisions made or at least supported, and software quality across multiple variants and versions analyzed. This enables restructuring of the software in order to counter quality degradation in it.

For example, a typical sprayer suitable for digital agriculture has a particular appearance and is used with up to 50 sections over an area of 100 ha to 200 ha. The reference model should be configurable such that all the target variants that are used in the field (16) can be modeled and are available for validation in the context of design (11) and development (12). A further application example is provided by the static or dynamic determination of a maintainability index of application software.

Modifications to the system environment since installation may be captured dynamically during runtime. This capture enables the digital twin to be continuously tested and updated—that is to say that each control unit has its own digital twin, from a design-dependent perspective, including a change history, for example:

$1^{st}$ update run on 11.24.2006

$2^{nd}$ update run on 03.26.2018

$3^{rd}$ update run on 07.01.2019

From this there is a comparison of the fingerprint to check whether the environment has changed since the last test, and from this an indicator is derived of whether anything in the system has changed—where appropriate giving rise to a fault.

The described comparison also proves important for diagnostics, and for the servicing (15) that is described below. A change in the I/O behavior would point to inconsistencies in the environment, which could provide the basis for notes in the fault log regarding a possible improper use, etc.

If something changes in the system configuration, in particular the installed software, or if the system as a whole changes, then, providing the change is intentional in the new system status—for example if there is an intentional modification to the hardware, software, configuration, connected machines, etc.—the corresponding digital twins or perspectives, where appropriate with the change history, are updated, or if this is the first time that it happens are generated for the first time. By contrast, if because of the fingerprint there is a suspicion of a change that is attributable to external factors such as a defect or wear, then troubleshooting is initiated. It is thus not only the digital twin but also the fingerprint ascertained locally on the control unit that have to be considered: The fingerprint provides a model of the I/O signal pattern of different signal types on different buses of the control system. For this reason, signal patterns with the provided and correct functions are recorded, and secured with the digital twin. The records serve as a basis for simulation and testing in order both to check function modifications and also to establish changes to the input or output of the system.

If there is a discrepancy between the current fingerprint and the one previously stored locally or in the cloud (17), then event handling is provided, depending on the connection with the cloud (17): If there is a connection, then, with the aid of particular algorithms, the functionality is tested and the control unit or particular functions of it are where appropriate temporarily blocked, or after testing are released for use again. If by contrast there is no connection, then with the aid of a whitelist it is possible to check whether the change is uncritical for functionality. If this cannot be confirmed, then the device is temporarily blocked until there is a connection with the back end in the cloud (17), when the procedure can be performed as above.

The fingerprint and the whitelist are part of the digital twin, and should be updated in accordance with the performance features and corresponding manifests. In this case, the digital twin may serve as a compared and where appropriate validated reference configuration in order for example to be able to establish whether functional modifications and in particular extensions have been intentionally made since the last update, and are thus valid. It is also possible for the system of the twin to be checked regularly for integrity and plausibility using appropriate routines. In addition to recording the current configuration and the status that was ascertained by field data capture—for example in respect of the start and abort frequency of particular functions, or diagnostics on different levels of the system, subsystem or function—it is also possible for the connected machines (accessories) and their changes over time (history) to be noted.

In the event of a fault, analysis of the digital twins from relevant perspectives may enable fault patterns to be identified and corresponding instructions or options for servicing and maintenance (15)—such as replacing sensors—to be provided. Automated fault processing is also possible here, in which the required steps for troubleshooting are developed in automated manner. These may comprise for example a selection of pre-defined measures, suggestions to users, developers, etc. and the definition of new measures using artificial intelligence (AI). Where fault scenarios are accordingly identified, if appropriate they may be automatically eliminated as a preventive measure on all similarly affected machines, or the corresponding datasets are at least stored in a database and kept for future diagnostics. For example, an identifiable change to the system that in this case is brought about by the end user may consist in a farmer removing a sensor and permanently connecting its connector to the positive terminal of the starter battery (for which the technical term is "steady plus"). When a fault message relating to this occurs, the fingerprint and digital twin are checked for plausibility.

Figure 2:
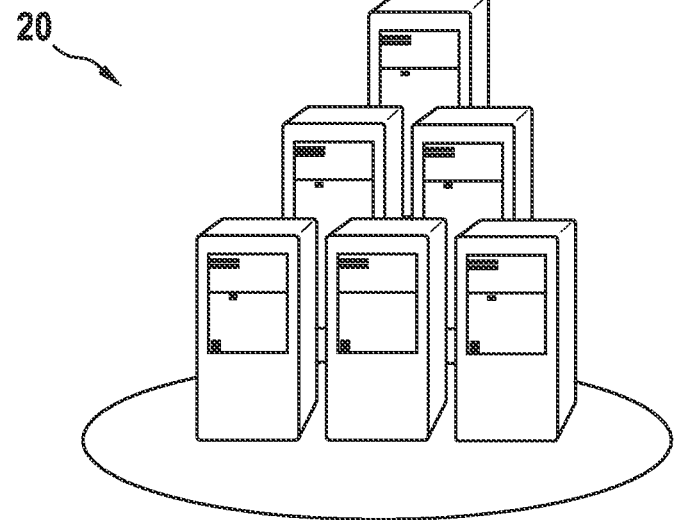
FIG. 2 shows schematically a computer center according to a second specific embodiment of the present invention.

This method (10) may be implemented for example in software or hardware or in a mixed form of software and hardware, for example in a computer center (20) in the cloud (17), as indicated by the schematic illustration of FIG. 2.

What is claimed is:

1. A method for testing compatibility between application software and a mobile working machine, comprising the following steps:
   aggregating in a cloud operating data that are captured during operation of the mobile working machine;
   modeling, using the operating data, the mobile working machine by a digital twin;
   testing compatibility of the application software with the mobile working machine in the cloud using the digital twin;

forming, using the digital twin, an environmental model of the mobile working machine; and
   testing a design of further application software using the environmental model, wherein:
      the digital twin includes a fingerprint, and
      the fingerprint is updated in accordance with a new performance feature of the mobile machine.

2. The method as recited in claim 1, wherein:
   the compatibility is tested before the application software is used in the field; and
   depending on the compatibility, the application software is deployed or retrofitting or modification of software and/or a peripheral device or hardware, is initiated.

3. The method as recited in claim 2, wherein:
   the compatibility is tested after deployment of the application software, and
   depending on the compatibility, the mobile working machine undergoes servicing or retrofitting, or a function is at least temporarily blocked.

4. The method as recited in claim 1, further comprising:
   carrying out, using the operating data, a development of updates of the application software.

5. The method as recited in claim 1, further comprising:
   identifying, using the captured operating data, changes in configuration that have been made at the mobile working machine; and
   writing the changes in configuration to a change history in the cloud.

6. The method as recited in claim 1, further comprising:
   identifying, using the captured operating data, any accessories of the mobile working machine;
   wherein the accessories are taken into account when the compatibility is tested.

7. A non-transitory machine-readable storage medium on which is stored a computer program for testing compatibility between application software and a mobile working machine, the computer program, when executed by a computer, causing the computer to perform the following steps:
   aggregating in a cloud operating data that are captured during operation of the mobile working machine;
   modeling, using the operating data, the mobile working machine by a digital twin; and
   testing compatibility of the application software with the mobile working machine in the cloud using the digital twin;
   forming, using the digital twin, an environmental model of the mobile working machine; and
   testing a design of further application software using the environmental model, wherein:
      the digital twin includes a fingerprint, and
      the fingerprint is updated in accordance with a new performance feature of the mobile machine.

8. A device for a mobile working machine, the mobile working machine being a mobile agricultural machine or mobile construction machine or industrial trucks or other utility vehicle, the device configured for testing compatibility between application software and the mobile working machine, the device configured to:
   aggregate in a cloud operating data that are captured during operation of the mobile working machine;
   model, using the operating data, the mobile working machine by a digital twin; and
   test compatibility of the application software with the mobile working machine in the cloud using the digital twin;
   forming, using the digital twin, an environmental model of the mobile working machine; and testing a design of further application software using the environmental model, wherein:

the digital twin includes a fingerprint, and the fingerprint is updated in accordance with a new performance feature of the mobile machine.

* * * * *